United States Patent
Rekieta et al.

(10) Patent No.: US 7,533,203 B2
(45) Date of Patent: May 12, 2009

(54) METHOD AND SYSTEM FOR RAPIDLY STARTING UP AN IEEE 1394 NETWORK

(75) Inventors: David W. Rekieta, Van Alstyne, TX (US); Bradley A. Little, Sherman, TX (US); Jason M. Cole, Anna, TX (US)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 10/840,685

(22) Filed: May 6, 2004

(65) Prior Publication Data

US 2005/0240285 A1  Oct. 27, 2005

(51) Int. Cl.
*G06F 13/00* (2006.01)
(52) U.S. Cl. .................................. 710/104
(58) Field of Classification Search ............. 710/104
See application file for complete search history.

(56) References Cited

U.S. PATENT DOCUMENTS

| | | | |
|---|---|---|---|
| 6,560,321 B1 | 5/2003 | Chen et al. | 379/100.17 |
| 6,678,477 B1 * | 1/2004 | Matsuda et al. | 398/136 |
| 6,813,651 B1 * | 11/2004 | Smith et al. | 710/20 |
| 6,934,300 B2 * | 8/2005 | Tomassetti et al. | 370/461 |
| 6,976,102 B1 * | 12/2005 | Groen et al. | 710/72 |
| 2002/0152341 A1 * | 10/2002 | Bennett | 710/104 |
| 2003/0196021 A1 * | 10/2003 | Botchek | 710/315 |
| 2005/0053381 A1 * | 3/2005 | Wood | 398/140 |
| 2006/0285802 A1 * | 12/2006 | Fingler et al. | 385/88 |

FOREIGN PATENT DOCUMENTS

| | | |
|---|---|---|
| WO | WO 97/49228 | 12/1997 |
| WO | WP 01/08373 A2 | 2/2001 |

OTHER PUBLICATIONS

IEEE Standard for a high performance serial bus—Amendment 1, IEEE computer society, Mar. 30, 2000, pp. ii,2,15-22,52-62,103-121,184-185.*

* cited by examiner

*Primary Examiner*—Glenn A Auve
*Assistant Examiner*—Christopher A Daley
(74) *Attorney, Agent, or Firm*—William B. Kempler; W. James Brady; Frederick J. Telecky, Jr.

(57) ABSTRACT

According to one embodiment of the invention, a network system for carrying control data between a controller and a device to be controlled is provided. The network system comprises a bus system operable to carry data between the controller and the device according to an IEEE 1394 standard. The IEEE 1394 standard defines a start up operation that includes one or more sequences. The bus system is also operable to perform a modified start up operation that excludes at least one of the sequences of the start up operation defined by the IEEE 1394 standard.

7 Claims, 2 Drawing Sheets

METHOD AND SYSTEM FOR RAPIDLY STARTING UP AN IEEE 1394 NETWORK

TECHNICAL FIELD OF THE INVENTION

This invention relates generally to electronics and more particularly to a method and system for rapidly starting up an IEEE 1394 network.

BACKGROUND OF THE INVENTION

IEEE 1394 is an electronics standard for connecting devices to other devices or to a microprocessor of a computer. A network or a bus that complies with the IEEE 1394 standard is referred to as an "IEEE 1394 network" or an "IEEE 1394 bus." An IEEE 1394 bus may accommodate up to 63 devices with data transfer speeds of up to 3.2 Gigabits per second. The flexibility and large bandwidth of an IEEE 1394 bus makes the IEEE 1394 bus ideal for consumer electronics and multimedia applications. Two well-known implementations of IEEE 1394 are trademarked as APPLE's FIREWIRE and SONY's i-LINK.

Command and control applications, such as drive-by-wire, may benefit from an IEEE 1394 bus's flexibility and capabilities. Drive-by-wire refers to a method of controlling components of an automobile using a computer rather than a mechanical linkage. Implementing an IEEE 1394 bus in command and control applications has been challenging. For example, whereas command and control applications generally require the control network to start up within approximately 100 microseconds, an IEEE 1394 bus generally requires approximately 500 milliseconds to start up. Such a relatively long start up time may compromise the performance of the controlled device in a command and control application. For example, if a control network of an electronically-modulated braking system of an automobile had a relatively long start up time, the time delay between when an operator steps on the brake pedal and when the brakes are actually applied may be too long and result in an accident.

SUMMARY OF THE INVENTION

According to one embodiment of the invention, a network system for carrying control data between a controller and a device to be controlled is provided. The network system comprises a bus system operable to carry data between the controller and the device according to an IEEE 1394 standard. The IEEE 1394 standard defines a start up operation that includes one or more sequences. The bus system is also operable to perform a modified start up operation that excludes at least one of the sequences of the start up operation defined by the IEEE 1394 standard.

Some embodiments of the invention provide numerous technical advantages. Other embodiments may realize some, none, or all of these advantages. For example, according to one embodiment, the start up time of an IEEE 1394 bus system is reduced by skipping one or more sequences that are included in the start up procedure defined by the IEEE 1394 standard. In another embodiment, command and control applications, such as drive-by-wire, may benefit from the flexibility and fast data transfer rate of an IEEE 1394 bus system without suffering from a relatively long start up time. In another embodiment, where an IEEE 1394 bus implemented as an optical network, the probability of erroneous data detection is reduced by skipping one or more sequences of the start up procedure that may contribute to the erroneous data detection.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Figure 1:
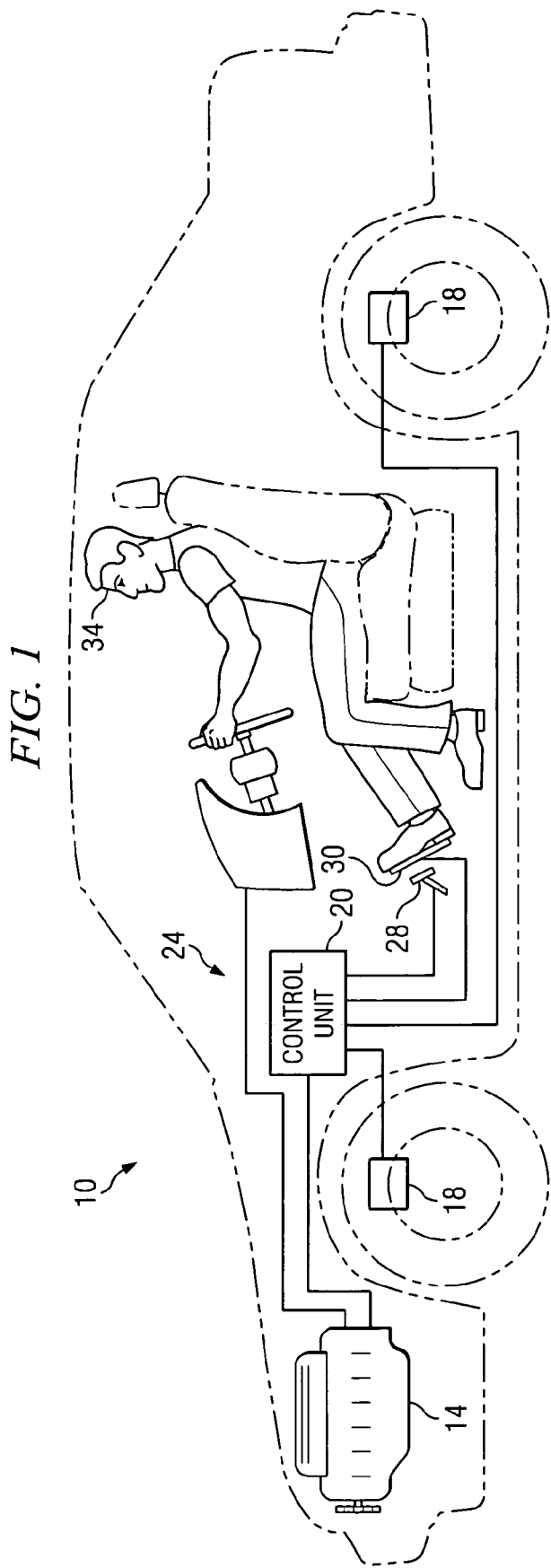
FIG. 1 is a schematic diagram illustrating one embodiment of a command and control system that may benefit from the teachings of the present invention.
Figure 2:
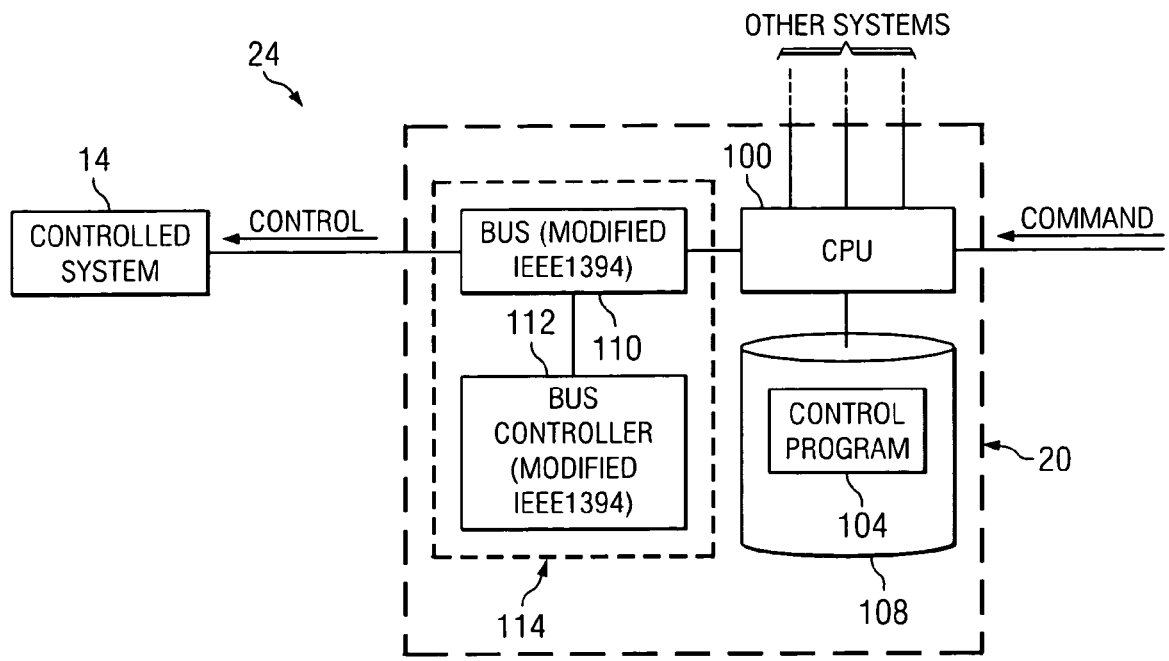
FIG. 2 is a block diagram illustrating one embodiment of a control system shown in FIG. 1.
Figure 3:
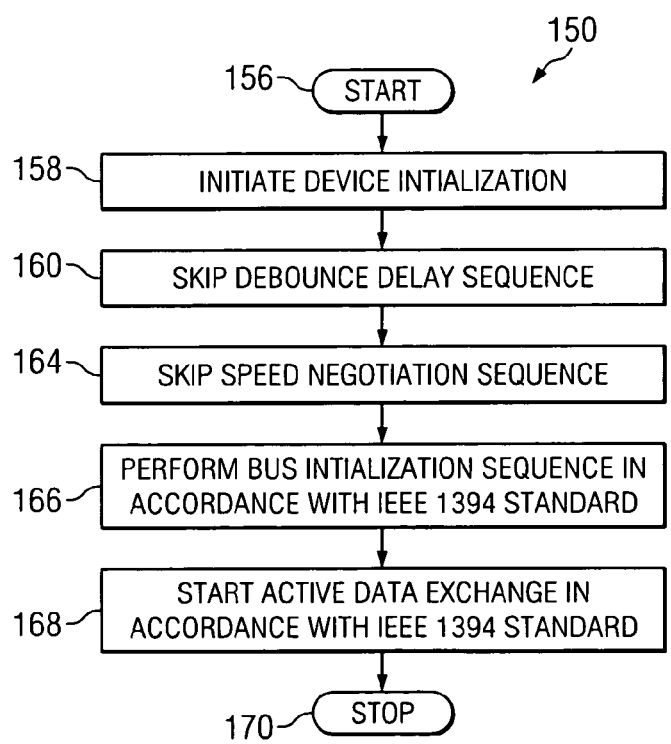
FIG. 3 is a block diagram illustrating one embodiment of a method for rapidly starting up an IEEE 1934 network.

Embodiments of the invention are best understood by referring to FIGS. 1 through 3 of the drawings, like numerals being used for like and corresponding parts of the various drawings.

FIG. 1 is a schematic diagram illustrating one embodiment of a command and control system 10 that may benefit from the teachings of the present invention. As shown in FIG. 1, system 10 is an automobile. For illustrative purposes, system 10 is referred to herein as automobile 10; however, any mechanical, electrical, or electromechanical system that includes one or more devices that may be controlled electronically may be system 10.

Referring again to FIG. 1, automobile 10 comprises an engine 14, a brake system 18, a control unit 20, a brake pedal 28, and a gas pedal 30. Brake system 18 and engine 14 are coupled to brake pedal 28 and gas pedal 30 through control unit 20. Engine 14 is operable to provide the drive power necessary to move automobile 10 and operate the various components of automobile 10. Brake system 18 is operable to apply a braking force to stop automobile 10.

Control unit 20 is operable to receive input from a driver 34 through pedals 28 and 30, and provide corresponding output signals to engine 14 and/or brake system 18 to implement the commands from driver 34. Control unit 20 may be operable to decide how to react to a particular input transmitted from pedals 28 and/or 30 by receiving input from engine 14 and/or brake system 18 and analyzing all the received input according to a control algorithm. For example, where control unit 20 is operable to conduct engine management, control unit 20 may be operable to optimize engine performance of engine 14 by controlling the fuel and air mixture of engine 14 depending on the amount of air available to engine 14, engine temperature, and the speed and the extent to which gas pedal 30 is pressed. In another example where control unit 20 is operable to electronically modulate brake system 18, control unit 20 may receive input from brake pedal 28, and depending on how much and how fast brake pedal 30 is pressed, apply an appropriate braking force through brake system 18. In some embodiments, control unit 20 may be operable to slow down engine 14 in conjunction with the application of braking force through brake system 18 in response to a particular input received from driver 34 through brake pedal 28. Control unit 20 and a device to be controlled, such as engine 14 or brake system 18, are referred to herein as a control system 24.

A control unit for controlling a device, such as an engine, generally includes a control bus that couples a microprocessor of the control unit to the device to be controlled. In command and control applications, such as control system 24 shown in FIG. 1, the response time between when a command is received at a control unit and when the appropriate output is transmitted to a controlled device in response to the received command may be important for a timely execution of the command. For example, a control unit designed to control a brake system of an automobile may experience an error during operation and reset itself. When the control unit resets itself, a bus system of a control bus connecting the brake system to the microprocessor of the control unit may be required to perform a start up procedure (also referred to as a start up operation). If the start up time of the control bus is too long, and brakes were applied during such a start up, the brake system may not be activated quickly enough. Such a delay may lead to accidents. Because of such scenarios, command and control applications generally require a start up time of approximately 100 microseconds or less for its control buses.

An IEEE 1394 bus system, which includes an IEEE 1394 bus and a bus controller, may offer a large bandwidth for faster data transmission and other capabilities that may be desirable in a command and control application. But an IEEE 1394 bus system is not commonly implemented for certain types of command and control applications because the start up of an IEEE 1394 bus is too slow unless redundant networks are used. The IEEE 1394 standard defines a start up procedure for an IEEE 1394 bus system to perform for an IEEE 1394 bus prior to assuming an active network status. The start up procedure may include a debounce delay sequence, a speed negotiation sequence, a training and symbol synchronization sequence, and a bus initialization sequence. The IEEE 1394 standard, such as IEEE 1394b-2002 and 1394a-2000, is incorporated herein by reference. An IEEE 1394 bus system may also perform a device initialization sequence in conjunction with the start up procedure. The device initialization sequence may vary depending on the particular vendor of the IEEE 1394 bus system.

The device initialization sequence is a sequence where the device is initialized to a known state. The time required to perform this sequence may vary based on the design but can be as short as a few microseconds. The debounce delay sequence is a sequence that enables a bus to delay informing a processor of a computer regarding a break in connection between a bus and a controlled device. This may be necessary for the "hot plug" capability of a bus because such a delay may prevent the processor from reading the device until the connection of a new device is completed. In general, the performance of the debounce delay sequence requires approximately 320 milliseconds. The speed negotiation sequence is a sequence that enables a processor and a controlled device to negotiate an appropriate communications speed. This may be necessary for the "hot plug" capability of a bus because different devices that may be plugged into a bus may be designed to communicate at different speeds, which may require a processor to agree on an operating speed with each connected device. Generally, the performance of the speed negotiation sequence requires approximately 84 to 168 milliseconds. Training and symbol synchronization sequence is a sequence where 10 bit symbols are exchanged and the node aligns to the beginning of these 10 bit symbols. Performing this sequence generally requires approximately 20-30 microseconds to perform but can be longer depending on certain factors, such as noise and the length of connection. The bus initialization sequence comprises a bus reset and a self-identification process. Performing the bus initialization sequence may require approximately 250 microseconds for a long bus reset to approximately 80 microseconds or less for a short bus reset. Factors, such as the number of nodes on the bus and thus the number of self-identification packets, may determine the actual time required to perform the bus initialization sequence. Performing the start up procedure by an IEEE 1394 bus system may require approximately 500 milliseconds, which is too slow compared to the approximately 100 microsecond requirement of a command and control application.

Implementing an optical network in accordance with the IEEE 1394 standard generally requires additional circuitry to account for possible false detection of data. False detection may occur because of the following. In general, the sensitivity of an optical network may have a tendency to increase when the network is not carrying signals. For example, an optical network may not carry signals during the time prior to the start up of the optical network. However, when the start up procedure defined by the IEEE 1394 standard is performed, an optical network may be required to exchange signals between nodes to identify and maintain connections between nodes. For example, each node of an optical network may transmit and expect to receive a signal from another node at 42 millisecond intervals. The frequency of signal transmission may increase if the optical network is performing a speed negotiation sequence. Because of the increased sensitivity of the optical network prior to the start up procedure, these signals for identifying connections and negotiating speed during the start up procedure may be interpreted as data. To compensate for this, additional circuitry may necessary to either filter out these signals exchanged during the start up procedure or to avoid false detection of these signals as data.

According to one embodiment of the present invention, a method and system for rapidly starting up an IEEE 1394 bus is provided by modifying a bus controller that controls the IEEE 1394 bus to skip one or more sequences that are included in the start up procedure defined by the IEEE 1394 standard. Skipping one or more sequences that may not need to be performed in a command and control application shortens the start up time of an IEEE 1394 bus, which allows the command and control application to benefit from the capabilities of the IEEE 1394 bus system while avoiding the problems associated with a relatively slow start up. In one embodiment, skipping one or more sequences simplifies the supporting circuitry of an optical IEEE 1394 network.

FIG. 2 is a block diagram illustrating one embodiment of control system 24 shown in FIG. 1. As described above in conjunction with FIG. 1, system 24 includes control unit 20 coupled with controlled system 14, such as engine 14. Although engine 14 is used as an example in system 24, any device or a combination of devices that may be controlled electronically may be system 14. Control unit 20 includes a processor 100 coupled to a bus system 114 and a memory 108 storing a control program 104. Bus system 114 includes a bus 110 and a bus controller 112. Processor 100 is operable to access and execute program 104 stored in memory 108 and to control system 14 through bus 110. When executing program 104, processor 100 is operable to receive input from an operator through one or more signal actuators, such as pedals 28 and 30 shown in FIG. 1, and transmit appropriate control signals to controlled system 14 through bus 110 according to the instructions of program 104. For example, when gas pedal 30 is abruptly pressed down all the way, processor 100 may receive an input indicating that action from gas pedal 30, and transmit a control signal to engine 14 indicating that a maximum amount of air and gas should be injected into the combustion chambers of engine 14 to produce maximum power. Processor 100 may be coupled to more than one device or systems that are controlled according to program 104. Examples of processor 100 include PENTIUM processors available from INTEL Corporation. While the command and control functions are described as being initiated from processor 100, other devices in other locations may also initiate portions or all of the command and control functions.

Bus system 114 is operable carry signals according to a protocol defined in IEEE 1394 standard. In one embodiment, IEEE 1394 standard refers to a network standard defining a start up procedure that includes at least one sequence associated with a "hot plug" capability, a "plug-and-play" capability, or any other analogous capability. Examples of the IEEE 1394 standard include IEEE 1394b-2002 standard and IEEE 1394a-2000 standard. In one embodiment, bus system 114 is an IEEE 1394 bus system where bus controller 112 has been modified to skip the debounce delay sequence and/or the speed negotiation sequence when performing the start up procedure defined by the IEEE 1394 standard. Such a start up procedure is referred to as a modified start up procedure or a modified start up operation. Both the debounce delay sequence and the speed negotiation sequence are associated with the hot plug and/or plug-and-play capability of IEEE 1394 standard, which may not be needed in a command and control environment because a control network of a command and control application is generally a fixed network.

A "fixed network" refers to a network that accepts only devices having fixed operating speeds, or that does not allow an exchange of devices while the system is not in operation. Because command and control applications use fixed networks, command and control applications may not need the hot plug or the plug-and-play capabilities. As such, the one or more sequences of the IEEE 1394 start up procedure that are associated with the hot plug and/or plug-and-play capabilities may be skipped while performing the start up procedure for command and control applications. By skipping these sequences, command and control applications may benefit from the advantages associated with an IEEE 1394 bus system without suffering from the problems associated with a slow start up time. In one embodiment, a command and control network may have fixed segments that may operate at different speeds. For example, some segments having optical fiber may operate at 200 megabits per second while other segments having copper connections may operate at 400 megabits per second or 800 megabits per second. Such embodiments may also benefit from the teachings of the present invention.

In one embodiment, IEEE 1394 bus system 114 is operable to skip the debounce delay sequence. In one embodiment, IEEE 1394 bus system 114 is operable to skip the debounce delay sequence, the speed negotiation sequence, and any other sequence that may be associated with a functionality of an IEEE 1394 bus system that is not required in a particular command and control application in which IEEE 1394 bus system 114 is used.

In one embodiment where bus system 114 is an IEEE 1394b-2002 bus system, sequences such as the debounce delay sequence and the speed negotiation sequence may be skipped. In one embodiment where bus system 114 is an IEEE 1394a-2000 bus system, the debounce delay sequence may be skipped. In such an embodiment, the speed negotiation sequence is not an issue because IEEE 1394a-2000 standard does not include a speed negotiation sequence. In one embodiment, any one or more of the sequences that are not needed in a particular application may be skipped by bus system 114. By skipping one or more sequences of a start up procedure defined by the IEEE 1394 standard, IEEE 1394 bus system 114 may require approximately 100 microseconds or less to start up, which complies with the start up requirements of many command and control applications. In some embodiments, even if skipping one or more sequences results in a start up time that is greater than 100 microseconds, a reduction of the start up time from the skipping of one or more sequences may facilitate the use of IEEE 1394 bus system 114 in command and control applications.

Bus controller 112 of bus system 114 may be configured to perform a modified start up procedure using any suitable method. In one embodiment, bus system 114 may be implemented as a state machine. Although bus 110 and bus controller 112 have been shown in FIG. 2 as bus system 114 that is separate from CPU 100, in some embodiments, bus controller 112 may be implemented as part of CPU 100.

In one embodiment, bus 110 may be an optical network that complies with IEEE 1394 standard. An optical network may be suitable in some applications where electromagnetic interference from a copper-based network may be undesirable in an application. In such embodiments where the network is an optical bus, skipping the debounce delay sequence and/or speed negotiation sequence may advantageous because the adjacent circuitry of optical network bus 110 may be simplified. This is because when the debounce delay sequence and the speed negotiation sequence are skipped, the signaling activity for maintaining a connection between the nodes of optical network bus 110 and the signaling activity for speed negotiation are not necessary. Thus, the probability of false data detection is lowered, which may eliminate the need for additional circuitry that is designed to minimize the false detection of data.

FIG. 3 is a block diagram illustrating one embodiment of a method 150 for rapidly starting up an IEEE 1394 network. For illustrative purposes, the features shown in FIGS. 1 and 2 are used as devices implementing the various acts of method 150. However, any suitable device or combination of devices may be used to implement the acts of method 150.

Method 150 starts at step 156. At step 158, bus system 114 initiates a particular type of device initialization sequence depending on the particular vendor of bus system 114. At step 160, bus system 114 skips the debounce delay sequence of the start up procedure defined in IEEE 1394 standard. At step 164, bus system 114 skips the speed negotiation sequence of the start up procedure defined in the IEEE 1394 standard. In some embodiments, either step 160 or step 164 may be omitted. At step 166, bus system 114 performs the bus initialization sequence of the start up procedure defined in the IEEE 1394 standard. In some embodiments, step 166 may be omitted. At step 168, active data exchange is performed using bus 110 in accordance with IEEE 1394 standard. In one embodiment, bus system 114 may require approximately 80-250 microseconds to perform the bus initialization sequence in accordance with the IEEE 1394 standard. In one embodiment, the debounce delay sequence of step 160 may require approximately 320 milliseconds to be performed by bus system 114. In one embodiment, the speed negotiation sequence of step 164 may require approximately 84 to 168 milliseconds to be performed by bus system 114. Method 150 stops at step 170.

Although some embodiments of the present invention have been described in detail, it should be understood that various changes, substitutions, and alterations can be made hereto without departing from the spirit and scope of the invention as defined by the appended claims.

What is claimed is:

1. A network system for carrying control data between a controller and a device to be controlled, the network system comprising:

a bus system operable to:

carry data between the controller and the device according to an IEEE 1394A standard, the IEEE 1394A standard defining a start up operation that includes one or more sequences; and perform a modified start up operation that excludes at least one of the sequences of the start up operation defined by the IEEE 1394A standard, wherein the one or more sequences comprise a debounce delay sequence, a speed negotiation sequence, a training and synchronization sequence, and a bus initialization sequence, and the at least one of the sequences comprise the debounce delay sequence and the speed negotiation sequence but not the training and synchronization sequence and the bus initialization sequence.

2. The network system of claim 1, wherein the bus system comprises a bus, and further comprising a system coupled to the bus system and operable to be controlled electronically over the bus, the system requiring the bus system to start up within a time period less than 500 milliseconds.

3. The network system of claim 1, wherein the bus system comprises a bus, and further comprising a system coupled to the bus system and operable to be controlled electronically over the bus, the system requiring the bus system to start up within a time period equal to or less than approximately 100 microseconds.

4. The network system of claim 1, wherein the bus system comprises a bus, and further comprising:

a system coupled to the bus system and operable to be controlled electronically over the bus, the system requiring the bus system to start up within a time period less than 100 microseconds; and wherein the bus system is operable to receive a plurality of devices each having a different operating speed that is fixed when coupled to the bus system.

5. The network system of claim 1, wherein the at least one sequence requires at least 499.9 milliseconds to be performed by the bus system.

6. A network system for carrying control data between a controller and a device to be controlled, the network system comprising:

a bus system operable to:

carry data between the controller and the device according to an IEEE 1394A standard, the IEEE 1394A standard defining a start up operation that includes one or more sequences; and perform a modified start up operation that excludes at least one of the sequences of the start up operation defined by the IEEE 1394A standard, wherein the one or more sequences comprise a bus initialization sequence, a debounce delay sequence, and a speed negotiation sequence, and the at least one of the sequences comprise the debounce delay sequence and the speed negotiation sequence but does not include the bus initialization sequence.

7. A network system for carrying control data between a controller and a device to be controlled, the network system comprising:

a bus system operable to:

carry data between the controller and the device according to an IEEE 1394A standard, the IEEE 1394A standard defining a start up operation that includes one or more sequences; and perform a modified start up operation that excludes at least one of the sequences of the start up operation defined by the IEEE 1394A standard, and further comprising an engine of an automobile coupled to the bus system, the engine operable to be controlled electronically over the bus, the engine requiring the bus system to start up within a time period equal to or less than approximately 100 microseconds;

wherein the one or more sequences comprise a bus initialization sequence, a debounce delay sequence, and a speed negotiation sequence, and the at least one of the sequences comprise the debounce delay sequence and the speed negotiation sequence but does not include the bus initialization sequence; and wherein the debounce delay sequence and the speed negotiation sequence together require up to 499.9 milliseconds to be performed by the bus system.

* * * * *